United States Patent [19]

Hansen

[11] Patent Number: 5,366,181
[45] Date of Patent: Nov. 22, 1994

[54] LANDING GEAR ENERGY ABSORPTION SYSTEM

[75] Inventor: Christopher P. Hansen, League City, Tex.

[73] Assignee: The United States of America as represented by the Administrator of the National Aeronautics and Space Administration, Washington, D.C.

[21] Appl. No.: 159,606

[22] Filed: Dec. 1, 1993

[51] Int. Cl.⁵ ............................................. B64C 25/58
[52] U.S. Cl. ............................. 244/104 R; 244/100 R; 188/381
[58] Field of Search ............... 244/104 R, 138, 100 R; 188/381, 371, 376, 377

[56] References Cited

U.S. PATENT DOCUMENTS

| | | | |
|---|---|---|---|
| 2,961,204 | 11/1960 | Rayfield et al. | 244/138 R |
| 3,038,175 | 6/1962 | Faget et al. | 5/481 |
| 3,128,970 | 4/1964 | Tinajero et al. | 244/100 R |
| 3,143,321 | 8/1964 | McGehee et al. | 244/100 R |
| 3,164,222 | 1/1965 | Conrad | 188/381 |
| 3,228,492 | 1/1966 | Blumrich | 188/377 |
| 3,295,798 | 1/1967 | Webb | 244/100 R |
| 3,528,530 | 9/1970 | Franck et al. | 188/377 |
| 3,603,433 | 9/1971 | Keathley | 188/381 |
| 4,462,578 | 7/1984 | Camilleri | 188/381 |
| 4,934,493 | 6/1990 | Bauer et al. | 188/381 |

Primary Examiner—Michael S. Huppert
Assistant Examiner—Anne E. Bidwell
Attorney, Agent, or Firm—Edward K. Fein; Guy M. Miller; Hardie R. Barr

[57] ABSTRACT

A landing pad system for absorbing horizontal and vertical impact forces upon engagement with a landing surface (15) where circumferentially arranged landing struts (12) respectively have a clevis (24) which receives a slidable rod member (13) and where the upper portion of a slidable rod member is coupled to the clevis by friction washers (30,32) which are force fit onto the rod member to provide for controlled constant force energy absorption when the rod member moves relative to the clevis. The lower end of he friction rod is pivotally attached by a ball and socket (44) to a support plate (42) where the support plate is arranged to slide in a transverse direction relative to a housing which contains an energy absorption material (50) for absorbing energy in a transverse direction.

15 Claims, 2 Drawing Sheets

LANDING GEAR ENERGY ABSORPTION SYSTEM

ORIGIN OF THE INVENTION

The invention described herein was made by employee(s) of the United States Government and may be manufactured and used by or for the Government of the United States of America for governmental purposes without the payment of any royalties thereon or therefore.

FIELD OF THE INVENTION

This invention relates to a landing gear or footpad for cushioning impact upon the landing of a descending craft on a landing surface, and more particularly, to a landing gear which can absorb impact energy with constant force in both horizontal and vertical directions in response to a landing impact.

BACKGROUND OF THE INVENTION

Various types of craft or vehicles are dropped or propelled into contact with a landing surface with sufficient force to require energy absorbing devices for cushioning the landing impact. For example, spacecraft landings, cargo dropped containers and the like have utilized energy absorbing systems such as parachutes to slow landing velocities, air bag systems, skidding devices, retro-rocket firing to decrease velocity, unidirectional crushable honeycomb devices, frangible tube devices and hydraulic pneumatic shock absorbers.

Where the landing is on a surface without atmosphere, parachute systems or air-drag dependent systems are of little value. Air bags require a compressed air container and a system of valves which are subject to mechanical malfunctions. Moreover, with this type of device, it is difficult to control the landing with any predictability and stability of the vehicle can be a problem.

Some landing devices contemplate skidding along the surface when landing and use of spikes for dragging the surface. This type of device offers only unidirectional energy absorption, and can dissipate either horizontal or vertical velocity, but not both. The two methods may not be used in conjunction with each other, so another system must also be used to dissipate the uncontrolled energy. These systems also rely heavily on the properties of the landing surface being utilized. Since it is often difficult to pinpoint exactly where the vehicle will land and the surface properties at the final landing site, these systems are not very desirable.

Retro-rocket firing from the vehicle is an effective method for cushioning landing forces, but it requires a complicated rocket device and fuel which, as a system, is very heavy and difficult to maintain. Near the landing surface, plume impingement from the rockets can also create problems.

Other devices, such as unidirectional honeycomb device in a landing pad, offer effective methods, of energy absorption, but unidirectional honeycomb can only absorb energy in one direction. Frangible tubes rely on material deformation to absorb energy, but provide very unpredictable and varying degrees of energy absorption.

Hydraulic and pneumatic shock absorbers are also effective for energy absorption, but are very difficult to maintain in working order in the unique environment of space. In addition, sealing problems in shock absorbers are very common in space related activities. The shock absorbers also tend to be complicated and heavier than many of the other methods or devices described or presented in this document.

Another important disadvantage of many of the above methods or devices is that the mechanisms which perform these functions must be located within the structure of the vehicle. This means that much of the landing load imported into parts of the structure of the vehicle cannot be limited. For example, all the landing structure located below shock or energy absorbers must be large enough to survive a very high impact load. In addition, the impact loading on the landing structure is highly dependent on landing velocities, landing surface conditions, structural weights, and many factors which are difficult to quantify early in a program and present problems which are difficult to change or modify later.

The landing system which is the subject of this invention absorbs the energy with a constant load (force) for a wide range of velocities, surfaces, weights, etc.

PRIOR ART PATENTS

U.S. Pat. No. 2,961,204 issued Nov. 22, 1960 to J. F. Rayfield (Cl 244/138) discloses a deceleration device for absorbing kinetic energy when a gondola impacts with the ground. The impact shoe 25 is hemispherical and is attached to a leg 23 which is telescopically received in a restraint tube 21. Cutters 31 are arranged to cut into a leg 23 upon relative longitudinal movement to decelerate the relative movement between a leg 23 and a restraint tube 21.

U.S. Pat. No. 3,128,970 issued on Apr. 14, 1964 to A. A. Tinajeto et. al. (Cl244) discloses ground effect plates 59 where a discharged gas provides a gas "cushion."

U.S. Pat. No. 3,143,321 issued on Aug. 4, 1964 to J. R. McGehee et. al. (Claims 244/138) discloses a frangible tube construction which is fragmented by a moving body to dissipate the load energy forces. Reference is made to a honeycomb structure in U.S. Pat. No. 3,038,175.

U.S. Pat. No. 3,164,222 issued on Jan. 5, 1965 to E. W. Conrad (Cl 244/138) discloses a lightweight kinetic of a absorbing system for a soft landing. In the absorbing system, overlapping sheets in tension are arranged to absorb kinetic energy by friction between sliding contacting surfaces.

U.S. Pat. No. 3,228,492 issued on Jan. 11, 1966 to J. F. Blumrich (Cl 224/138) discloses a single shot shock absorber which utilized lightweight crushable material disposed between two movable plates.

U.S. Pat. No. 3,528,530 issued Sep. 15, 1970 to H. C. Frank et. al. (Cl 244/138) discloses a braking device which is expandable upon impact by a cage which radially expands upon impact to absorb and to provide a braking action.

SUMMARY OF THE PRESENT INVENTION

The present invention is embodied in a landing pad on a vehicle for energy absorption, at a constant force, of both vertical and horizontal forces upon landing. The landing pad includes a pad housing with a cylindrically shaped sidewall and a flat slidable bottom surface. In the interior of the pad housing is a cylindrical floor layer which is constructed of a thickness of honeycomb, to provide a stiff, lightweight sliding surface for the bottom of the footpad and the sliding flat plate member. Centrally located on the floor layer is a sliding flat plate member which is connected by a ball joint to a transverse, tubular friction rod member. Disposed about the rod member in the housing is a radially crushable or deformable material. The plate member is both supportable and slidable on the floor layer and the pivotal connection of the rod member with the plate member allows transverse or radial movements of the rod member relative to the housing for absorbing lateral energy loading.

The rod member is slidable and received in the aligned bores of a clevis on a landing strut of a vehicle. Friction washers are frictionally attached to the rod member and support the rod member in the clevis. Upon impact loading, the friction fit washers allow energy absorption, with a controlled maximum force, upon relative movement between clevis and the friction rod.

DESCRIPTION OF THE INVENTION

Figure 1:
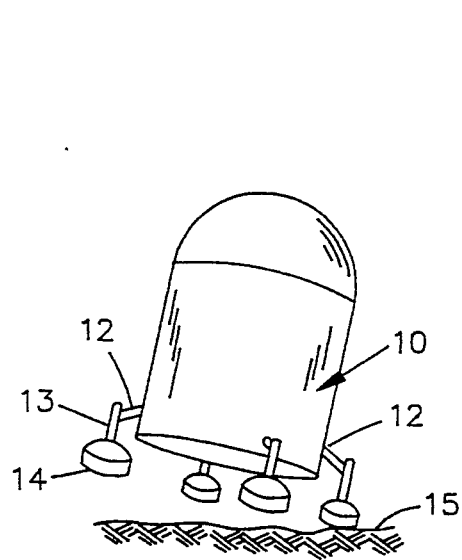
FIG. 1 is a perspective and schematic illustration of a landing craft.

As shown schematically in FIG. 1, a landing craft or vehicle 10 can be provided with landing struts 12 circumferentially disposed about a central longitudinal axis for the vehicle. A strut 12 is connected to a landing pad 14 by a rod member 13. The landing pads 14 are intended to engage a landing surface 15 and respectively tilt, if necessary, to an angular position. A landing pad 14 is intended to absorb transverse horizontal and vertical impact forces.

Figure 2:
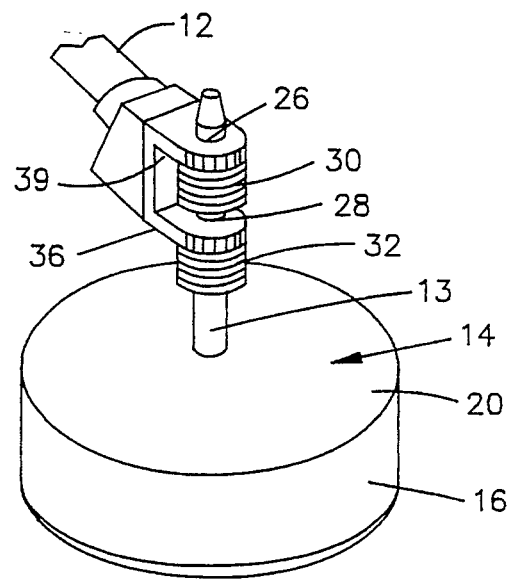
FIG. 2 is a perspective view of a landing pad embodying the present invention.
Figure 3:
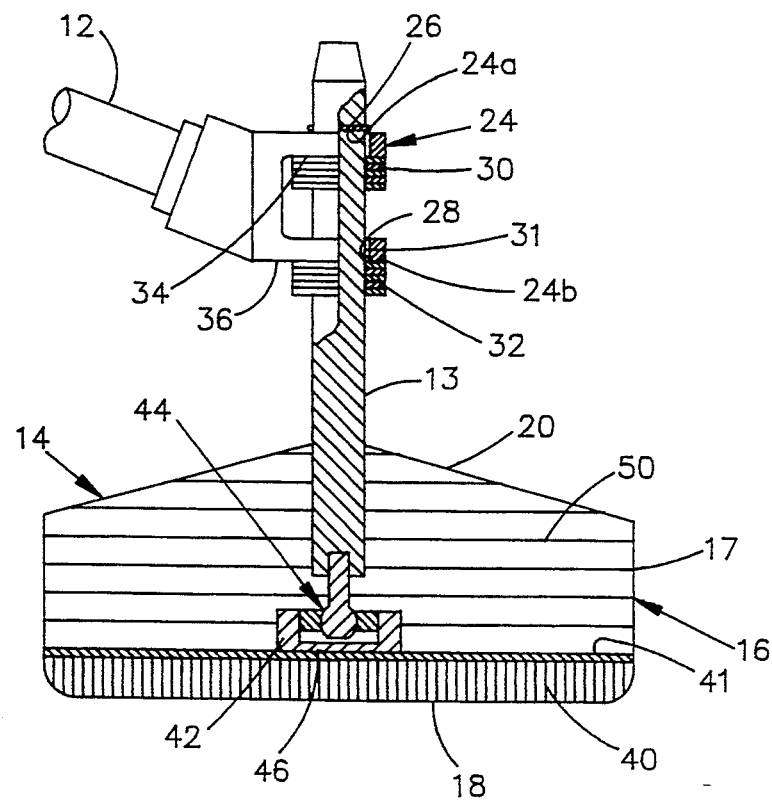
FIG. 3 is a view illustrating the cross-section through a landing pad.

A landing pad 14, as illustrated in FIG. 2 & FIG. 3 includes a cylindrically shaped housing 16 with a flat bottom surface 18. The upper surface 20 of the landing pad is conically shaped.

The landing pad 14 is attached to a transverse friction rod member 13 which is initially centrally located in the housing 16. The longitudinal axis of a rod member 13 is preferably arranged perpendicular to the bottom wall surface 18. A landing strut 12 is provided with a clevis 24 which has vertically aligned openings 26, 28. Friction washers 30, 32 are mounted on the rod member 13 below the lower surfaces 34, 36 of the clevis 24.

As shown in FIG. 3, the housing 16 has an outer cylindrical wall which is perpendicular to the bottom wall 18 and is joined by a smooth, curved surface to the bottom wall 18. The wall of the housing is made of a thin walled material such as aluminum. In the lower part of the housing 16 is a conventional honeycomb plate 40 which has a thickness sufficient to provide a large, stiff contact or floor area for the bottom wall 18 and which not deform under predetermined impact forces. The stiffness of the plate 40 in the housing 16 resists a tendency of the housing to become deformed and embedded in a landing surface. The honeycomb plate 40 is also provided with a smooth sliding upper surface 41.

The friction rod member 13 is made from a tubular, high strength material. The outer diameter of the rod member 13 is made as large as possible to provide a large frictional area, and the wall of the tubular member is designed to resist bending yet remain lightweight. At the lower end of the rod member 13 is a teflon coated, sliding plate 42. The sliding plate 42 is connected by a ball joint 44 to the rod member 13 and its lower, cylindrically shaped flat surface 46 provides both a vertical load plate and a slidable surface. The lower flat surface 46 has a large enough surface area to prevent embedding into the honeycomb floor plate 40 under preset landing loads.

In the housing 16 surrounding the rod member 13, there is a deformable material 50. The material 50 should have a crushing characteristic similar to a honeycomb material and it is desirable to have a constant load characteristic during crushing. The material 50 must also perform in a radial direction (transverse to the axis of a rod member 13) as opposed to the normal unidirectional properties of a typical honeycomb. This can be accomplished, for example, by placing small sections in honeycomb in a radial orientation direction. Other suitable material, for example, is an isotropic foam metal which is available under the brand name DUOCEL (Energy Research and Generation, Inc., Loveland Street, Oakland, Calif.).

The sets of friction washers 30, 32 on the rod member 13 equalize the forces placed on the main body fitting flanges 24(a), 24(b) of the clevis 24. The friction forces are controlled by sizing the inner diameter of the friction washers 30, 32 smaller than the outer diameter of the rod member 13. The washers are press fit onto the rod member 13 so that the inner two-thirds of a washer are placed into plastic yielding by the interference fit. This yielded section creates a constant force between a friction washer and the surface of the rod member 13. As long as the washer's inner surface is yielded, the radial force remains relatively constant, therefore the tolerances on the rod diameter and hole diameter of the friction washer are not critical. This makes manufacturing of the rods and washers much easier. Since the force between a rod and a washer is more constant and the coefficient of friction between the two surfaces is fairly constant, the force exhibited by a washer onto a rod as the washer slides is constant and limited to the design value. If twice the force of one washer is needed, a second washer is simply added. In this fashion, the system may be tailored during the design phase to fit any reasonable system's needs. If testing later indicates a change in the required force value, the system may by modified literally on the spot by adding or removing washers.

The two flanges 24(a), 24(b) of the clevis 24 are spaced a sufficient distance apart to allow any encountered bending loads in the friction rod 13 to be contained. The flanges contain a lubricated beating surface to allow the rod member 13 to travel through a flange without binding, even though the rod member may be under bending loads. A Teflon sleeve or linear bearing assembly 31 can be used in the bores in the flanges depending upon the application of the device and the expected bending loads. The rod member 13 can also be lubricated to allow a constant force to be exhibited by the friction washers' sliding motion. A suitable lubricant is Miller Stephenson dry-film lubricant MS-122, produced by Miller Stephenson Chemical Company, Inc. Los Angeles, Calif., and is covered under Military Specification MIL-L-60326 (MU) Amend. 1, Type 1. A more complete description of the friction rod and washer assembly can be found in U.S. Pat. No. 3,603,433 by Keathley and Wesselski.

A landing pad 14 is designed to absorb energy in the vertical and horizontal transverse directions. When the landing pads 14 on a vehicle impact with the landing surface, the vertical load is transmitted directly to a friction rod member 13, placing an upward force on the rod member. The friction washers 30, 32 are restrained in the clevis 24 from moving upward. Therefore, a rod member 33 will slide upward through the washers. The friction washers 30, 32 absorb energy through the friction between the friction rod member and press-fit washers (See U.S. Pat. No. 3,603,433). The advantage of this system is that the load placed on the clevis 24 and thus the structure is constant, and limited to a preset value, and does not depend on impact velocity. As long as enough stroke of the rod member along its axis is provided, a precise amount of energy may be absorbed and the maximum load input into the structure has a known, and easily adjustable limit. This load limiting characteristic is extremely useful in designing of vehicle landing structures and results in a much lighter vehicle design.

If a landing pad 14 on a vehicle lands on a landing surface with a horizontal velocity, the system is designed to absorb energy through material deformation of the material 50 within the housing 16. When a footpad hits, the tendency will be for the bottom surface 18 to slide along the landing surface. When the force of friction between the landing surface and the bottom surface 18 of the footpad member is greater than the force of friction between the end cap member 42 and the plate 40, the friction rod member 13 will begin to crush through the radially deformable material 50 at a constant load (See FIG. 5). The deformable material 50 is held in place by the sidewall of the housing 16. This means that the maximum lateral force that the friction rod member 13 will see is determined strictly by the characteristics of the rod member 13 crushing through the deformable material 50. This crushing force is easily determined and can easily be tailored to fit any energy absorption needs. This system, like the friction washers, is a load limiting system. The maximum load that the housing will see is limited by the material 50 chosen and is completely independent of impact velocity.

Figures 4, 5:
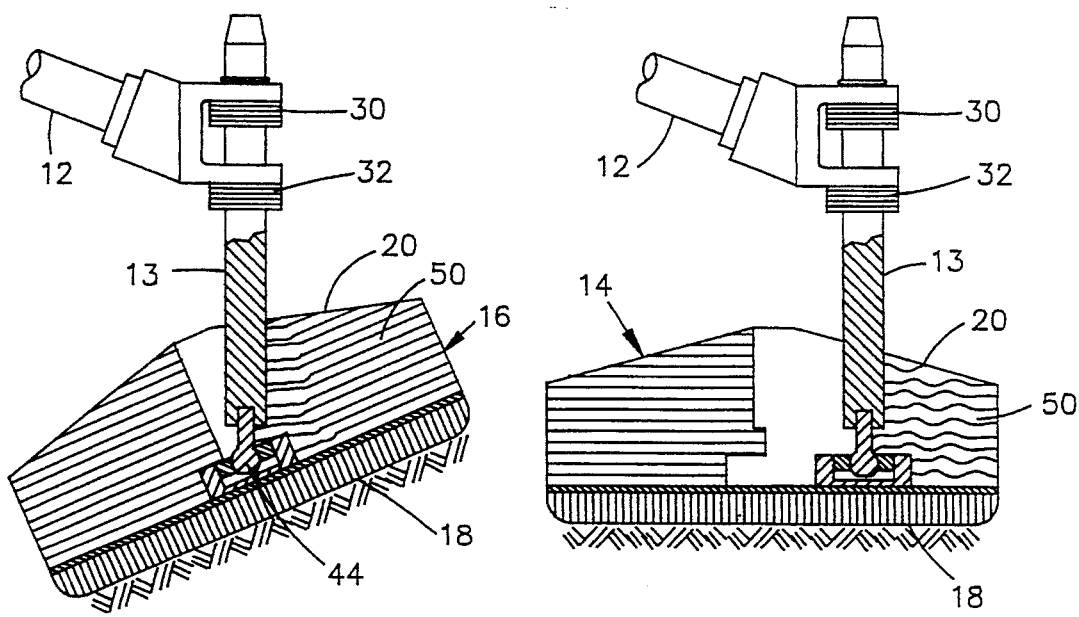
FIG. 4 is a view similar to FIG. 3, but illustrating the landing pad in engagement with an inclined surface.
FIG. 5 is a view in cross-section similar to FIG. 3 and showing another condition of the landing pad.

The system is also capable of landing on angled slopes. FIG. 4 shows how the system reacts to angles. The footpad housing 16 is allowed to rotate by the ball joint 44 connection to the friction rod 13. When the housing 16 rotates, an area of deformable material 50 is crushed, as shown, helping to absorb energy.

Figure 6B:
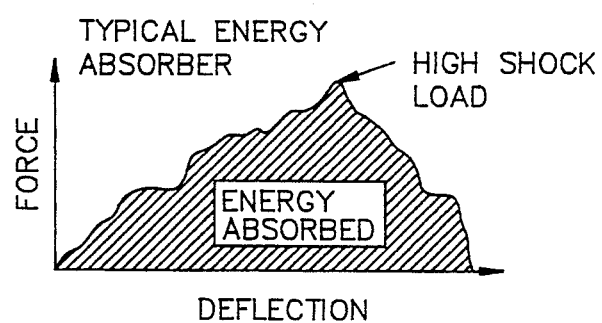
FIG. 6(B) is a plot of a typical force/deflection profile.
Figure 6A:
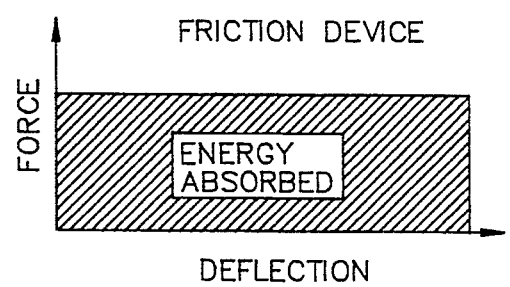
FIG. 6(A) is a plot of the invention's force/deflection profile.

Referring to FIG. 6(b), a typical force/deflection plot illustrates the absorption of energy with a high shock load. In contrast thereto, the present invention provides controlled force energy absorption characteristics as illustrated in FIG. 6(a).

Taken together, all the parts of the landing pad 14 operate as a unique and simple load limiting device. Another advantageous aspect of the system is its ability to tailor the G-levels seen by the structure on impact. This is simply accomplished by changing the friction fit force levels of the washers 30, 32 and by changing type of material. By allowing enough stroke, the G-levels may be precisely controlled. The washers' sliding force level is easily adjusted by changing their size or material specifications, or by simply adding or subtracting the number of washers used in the system. The deformable material 50 is also easy to modify by changing density or core sizes. This aspect is very attractive in designing landing systems for one-time impact type applications or where extremely lightweight structures are required.

This system may be used on any single-impact application, such as dropping parachute pallets from cargo planes, or on other manned or unmanned Lunar or Martian landing vehicles. The system is easily modified for and attached to any structure where the capabilities of the system described are desirable. The friction washer/rod system can also be easily modified to reset themselves if multiple uses of the system are desired.

Advantages of the invention include the following:
1. the friction washers and honeycomb-type deformable material act as a load limiter which allow the landing gear and structure to be sized for a preset, maximum specific load, independent of the velocity or angle at which the spacecraft lands resulting in an extremely light vehicle.
2. the system is simple, easy to manufacture and maintain. The simplicity of the system also allows it to be easily modified by simply adding or subtracting friction washers, to account for a large range of landing conditions, surface conditions, and structural requirements;
3. the vertical and horizontal components of velocity are de-coupled in this system. All the horizontal velocity is removed by skidding and by deformation of the honeycomb-type material, and the vertical component is removed by the friction washers;
4. by utilizing the constant-force energy absorbing qualities of the deformable materials and the friction washers, the maximum energy absorbing efficiency is obtained.
5. the system is relatively insensitive to surface conditions. If a very hard landing surface is encountered, the deformation of the system can absorb the entire amount of kinetic energy present in the system, and the load will never exceed its designed limits. If a softer landing surface is encountered, deformation of the landing surface will only help the system and the loads will never exceed a preset amount. Surface angles are also easily accommodated by the system;
6. the system can be attached and tailored to virtually any structure, with few modifications;
7. the system is lightweight, and can fit in a relatively small volumetric space; and
8. articulating landing gear is no longer necessary because all of the landing energy is absorbed in the footpad system. In addition, since the system is attached to the end of the landing strut, the landing strut itself benefits from the load limiting characteristics of the energy absorption system.

It will be apparent to those skilled in the art that various changes may be made in the invention without departing from the spirit and scope thereof and therefore the invention is not limited by that which is disclosed in the drawings and specifications but only as indicated in the appended claim.

I claim:
1. A landing pad system for a vehicle for controlling G-loading resulting from an impact landing with a landing surface in transverse directions, said landing pad system comprising:

landing strut members disposed circumferentially about a central longitudinal axis of a base on a vehicle;

first energy absorbing means attached to each strut member and including a rod member and friction elements in engagement with an upper portion of said rod member for absorbing energy upon relative movement between said friction elements and said rod member, said rod member having a longitudinal stroking axis in a first alignment with respect to said central longitudinal axis for absorbing impact energy in a first direction relative to said vehicle;

a landing pad housing attached to each rod member, said landing pad housing having a bottom surface for engaging a landing surface;

second energy absorbing means disposed in said housing about a lower portion of said rod member and including a slidable mounting of said lower portion of said rod member relative to said housing for movement independent of said first energy absorbing means and further including energy absorbing elements disposed about said lower portion of said rod member for absorbing impact energy in a second direction transverse to said stroking axis upon relative movement between the lower portion of the rod member and said housing.

2. The apparatus as set forth in claim 1 wherein the slidable mounting of said second energy absorbing means includes a plate member and a pivotal connection between said plate and said rod member.

3. The apparatus as set forth in claim 2 wherein the pivotal connection between said plate member and said rod member is a ball and socket.

4. The apparatus as set forth in claim 3 wherein a thickness of stiff, lightweight material is disposed between said plate member and a bottom wall of the housing to provide a stiff sliding surface within the housing.

5. The apparatus as set forth in claim 4 wherein the material between the plate member and the bottom wall of the housing has a honeycomb construction for providing a stiff, lightweight sliding surface on which the plate member may move in a transverse direction and which prevents excessive sinking of the bottom surface of said landing pad housing into the landing surface.

6. The apparatus as set forth in claim 5 wherein the energy absorbing elements disposed about said lower portion of said rod member have a honeycomb construction arranged for absorbing forces in a direction transverse to the stroking axis of a rod member.

7. The apparatus as set forth in claim 1 wherein said first energy absorbing means includes a clevis arranged to slidably receive a rod member and said friction elements are annular washer members on a rod member to attach a rod member to a clevis where the washer members are force fitted onto a rod member for providing a relatively constant force energy absorption.

8. A landing pad system for a vehicle for controlling G-loading resulting from an impact landing with a landing surface in transverse directions, said landing pad system comprising:

landing strut members disposed circumferentially about a central longitudinal axis of a base on a vehicle;

a clevis on the terminal end of each strut member having aligned openings along an stroking axis arranged parallel to the longitudinal axis of the vehicle;

a rod member having an upper portion slidably received in said aligned openings for movement in a first direction aligned with said stroking axis;

annular friction washer elements in engagement with said upper portion of said rod member for absorbing impact energy upon relative movement between said washer elements and said rod member, said washer elements having a force fit relationship relative to said rod member;

a landing pad housing attached to each rod member, said landing pad housing having a bottom surface for engaging a landing surface; and surface energy absorbing means disposed in said housing about a lower portion of said rod member and including a slidable mounting of said lower portion of said rod member relative to said housing for movement of said rod member and further including energy absorbing elements disposed about said lower portion of said rod member for absorbing impact energy in a second direction transverse to said stroking axis upon relative movement between the lower portion of the rod member and said housing.

9. The apparatus as set forth in claim 8 wherein the slidable mounting of said lower portion of said rod member includes a plate member and a pivotal connection between said plate and said rod member.

10. The apparatus as set forth in claim 9 wherein the pivotal connection between said plate member and said rod member is a ball and socket.

11. The apparatus as set forth in claim 10 wherein a thickness of stiff, lightweight material is disposed between said plate member and a bottom wall of the housing to provide a sliding surface within the housing.

12. The apparatus as set forth in claim 11 wherein the stiff, lightweight material between the plate member and the bottom wall of the housing has a honeycomb construction for providing a stiff, lightweight sliding surface on which the plate member may move in a transverse direction and which prevents sinking into the landing surface of the bottom surface of said landing pad housing.

13. The apparatus as set forth in claim 8 wherein the energy absorbing elements have a honeycomb construction arranged for absorbing forces in a direction transverse to the stroking axis of a rod member.

14. The apparatus as set forth in claim 8 wherein the slidable mounting of the lower portion of the rod member includes a slidable plate member arranged to slide on a surface which, in a initial position of a landing pad, is disposed normal to said stroking axis and wherein the plate member has a pivotal connection with a rod member.

15. The apparatus as set forth in claim 14 wherein the pivotal connection is a ball and socket.

* * * * *